(12) United States Patent
Maguire

(10) Patent No.: US 9,374,428 B2
(45) Date of Patent: *Jun. 21, 2016

(54) DISTANCE-DEPENDENT OR USER-DEPENDENT DATA EXCHANGE BETWEEN WIRELESS COMMUNICATION DEVICES

(71) Applicant: Facebook, Inc., Menlo Park, CA (US)

(72) Inventor: Yael Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,545

(22) Filed: Feb. 23, 2015

(65) Prior Publication Data

US 2015/0172397 A1 Jun. 18, 2015

Related U.S. Application Data

(63) Continuation of application No. 13/735,938, filed on Jan. 7, 2013, now Pat. No. 9,055,433, which is a continuation-in-part of application No. 13/735,783, filed on Jan. 7, 2013, now Pat. No. 9,008,114.

(60) Provisional application No. 61/585,691, filed on Jan. 12, 2012.

(51) Int. Cl.
*G06F 17/00* (2006.01)
*H04L 29/08* (2006.01)
(Continued)

(52) U.S. Cl.
CPC .............. *H04L 67/18* (2013.01); *H04B 17/318* (2015.01); *H04L 51/32* (2013.01); *H04W 4/02* (2013.01); *H04W 4/023* (2013.01); *H04W 12/02* (2013.01); *H04W 28/22* (2013.01);
(Continued)

(58) Field of Classification Search
None
See application file for complete search history.

(56) References Cited

U.S. PATENT DOCUMENTS

| 7,058,414 | B1 * | 6/2006 | Rofheart | G01S 7/023 455/411 |
| 7,574,219 | B2 * | 8/2009 | Rofheart | G01S 7/023 455/404.2 |

(Continued)

FOREIGN PATENT DOCUMENTS

| JP | 2001-197567 | 7/2001 |
| JP | 2003-218776 | 7/2003 |

(Continued)

OTHER PUBLICATIONS

Notice of Allowance for U.S. Appl. No. 13/735,783, Feb. 25, 2015.

(Continued)

*Primary Examiner* — Jason K. Gee
*Assistant Examiner* — Olanrewaju Bucknor
(74) *Attorney, Agent, or Firm* — Baker Botts L.L.P.

(57) ABSTRACT

In one embodiment, a method includes identifying a second user of a social-networking system authorized to receive data of a first data type from a first wireless device, the identifying based on one or more attributes of one or more edges between nodes in a social graph of the social-networking system, one of the nodes corresponding to a first user and another of the nodes corresponding to the second user. The method also includes determining a distance between the second user and the first wireless device. The method further includes sending the data of the first data type when the distance is less than a specific distance.

20 Claims, 14 Drawing Sheets

(51) Int. Cl.

| | | |
|---|---|---|
| *H04L 12/58* | (2006.01) | |
| *H04W 4/02* | (2009.01) | |
| *H04W 52/28* | (2009.01) | |
| *H04W 12/02* | (2009.01) | |
| *H04B 17/318* | (2015.01) | |
| *H04W 28/22* | (2009.01) | |
| *H04W 64/00* | (2009.01) | |
| *G06F 21/43* | (2013.01) | |
| *G06F 21/36* | (2013.01) | |
| *H04W 52/24* | (2009.01) | |
| *H04W 4/00* | (2009.01) | |

(52) U.S. Cl.
CPC .......... *H04W 52/283* (2013.01); *H04W 64/00* (2013.01); *G06F 21/36* (2013.01); *G06F 21/43* (2013.01); *H04W 4/008* (2013.01); *H04W 52/247* (2013.01)

(56) References Cited

U.S. PATENT DOCUMENTS

| | | | |
|---|---|---|---|
| 7,804,829 B2 | 9/2010 | Iwasaki | |
| 8,265,654 B2* | 9/2012 | Mgrdechian | G06Q 30/0207 370/338 |
| 8,340,707 B2* | 12/2012 | Pan | H04M 3/42008 455/418 |
| 8,750,192 B2* | 6/2014 | Amini | H04L 1/0041 370/312 |
| 8,848,624 B2* | 9/2014 | Amini | H04L 1/0041 370/329 |
| 9,055,433 B2 | 6/2015 | Maguire | |
| 2006/0008016 A1 | 1/2006 | Balakrishnan | |
| 2007/0238420 A1 | 10/2007 | Legouable | |
| 2008/0208971 A1 | 8/2008 | Costin | |
| 2009/0111378 A1 | 4/2009 | Sheynman | |
| 2009/0312033 A1 | 12/2009 | Shen | |
| 2011/0125850 A1* | 5/2011 | Rahnama | G06Q 10/10 709/205 |
| 2012/0209929 A1* | 8/2012 | Bercu | G06Q 10/00 709/206 |
| 2013/0227651 A1 | 8/2013 | Schultz | |
| 2013/0267204 A1 | 10/2013 | Schultz | |
| 2013/0272342 A1 | 10/2013 | Pustovalov | |
| 2013/0290703 A1 | 10/2013 | Resch | |
| 2015/0119086 A1 | 4/2015 | Mirowski | |
| 2015/0156617 A1 | 6/2015 | Maguire | |

FOREIGN PATENT DOCUMENTS

| | | |
|---|---|---|
| JP | 2008-252298 | 10/2008 |
| JP | 2010-141758 | 6/2010 |
| JP | 2013-054733 | 3/2013 |
| JP | 2013-162307 | 8/2013 |

OTHER PUBLICATIONS

Amendment for U.S. Appl. No. 13/735,783, Feb. 10, 2015.
Non-Final Office Action for U.S. Appl. No. 13/735,938, Oct. 24, 2014.
Response to Non-Final Office Action for U.S. Appl. No. 13/735,938, Dec. 15, 2014.
Notice of Allowance for U.S. Appl. No. 13/735,938, Jan. 21, 2015.
Amendment After Allowance for U.S. Appl. No. 13/735,938, Feb. 13, 2015.
Non-Final Office Action for U.S. Appl. No. 14/622,564, Jun. 8, 2015.
Response to Non-Final Office Action for U.S. Appl. No. 14/622,564, Sep. 3, 2015.
Final Office Action for U.S. Appl. No. 14/622,564, Nov. 17, 2015.
JP Office Action Notification of Reasons for Rejection for Japanese Patent Application No. 2015-175857 (with English translation), Dec. 15, 2015.
Notification of Reasons for Rejection for JP Patent Application No. 2015-551817 from Japan Patent Office (with English translation), Dec. 1, 2015.
Notice of Allowance for KR Patent Application No. 10-2015-7034614 from Korean Intellectual Property Office (with English translation), Mar. 30, 2016.
Response to Final Office Action for U.S. Appl. No. 14/622,564, Jan. 4, 2016.
Non-Final Office Action for U.S. Appl. No. 14/622,564, Feb. 23, 2016.
Non-Final Office Action for U.S. Appl. No. 14/622,564, Mar. 14, 2016.

* cited by examiner

DISTANCE-DEPENDENT OR USER-DEPENDENT DATA EXCHANGE BETWEEN WIRELESS COMMUNICATION DEVICES

PRIORITY

This application is a continuation under 35 U.S.C. §120 of U.S. patent application Ser. No. 13/735,938, filed 7 Jan. 2013 and issued 9 Jun. 2015 as U.S. Pat. No. 9,055,433, which is a continuation-in-part, under 35 U.S.C. §120, of U.S. patent application Ser. No. 13/735,783 filed on 7 Jan. 2013 and issued 14 Apr. 2015 as U.S. Pat. No. 9,008,114, which claims the benefit, under 35 U.S.C. §119(e), of U.S. Provisional Patent Application No. 61/585,691, filed on 12 Jan. 2012, each of which is incorporated herein by reference.

TECHNICAL FIELD

This disclosure generally relates to transmitting data between wireless devices.

BACKGROUND

Conventional radios utilize radio metrics to adjust the rate of transfer of information from one source to another. The radio metrics may be, for example, BER (Bit Error Rate) and RSSI (Received Signal Strength Indication). The metrics are typically found in WLAN (Wireless Local Area Network) and WAN (Wide Area Network) networks such as 3G, LTE (Long Term Evolution), CDMA (Code Division Multiple Access), and WiFi systems. In these systems, the rate at which a wireless device can exchange data with another wireless device is proportional to the distance between the wireless devices. For example, the shorter the distance between the wireless devices, the faster the transmission of data between the wireless devices. Thus, the rate of data transmission changes relative to the distance between the wireless devices exchanging data. The data remains the same regardless of the distance between the wireless devices, and thus the time it takes to transfer the data increases as the distance between the devices increases.

SUMMARY OF PARTICULAR EMBODIMENTS

According to one aspect, systems and methods are provided for providing data that is adjusted according to the distance between wireless devices exchanging the data. In one embodiment, spatial zones of information are created as a function of the distance between wireless devices. In one example, data to be transmitted from a first wireless device to a second wireless device is adjusted based on which spatial zone of information the second wireless device is located in.

In some embodiments, a first wireless device may transmit data that can only be received by one or more second wireless devices within a specific distance from the first wireless device. Those wireless devices beyond the specific distance from the first wireless device are not able to receive the data. There may be different types of data associated with different distances.

Moreover, in some embodiments, a first wireless device may transmit data that can only be received by one or more second wireless devices belonging to one or more specific users within a specific distance from the first wireless device. Those wireless devices beyond the specific distance from the first wireless device are not able to receive the data. Those wireless devices within the specific distance from the first wireless device but belong to other users also are not able to receive the data.

In some embodiments, a user of the first wireless device may specify (e.g., through a user interface) which data, when transmitted by the first wireless device, can be received by which second wireless devices belonging to which other users and within what distances from the first wireless device. The user of the first wireless device may specify the data transmission criteria ahead of time. Then, when the first wireless device comes within the specified distance to a second wireless device belonging to an appropriate user, the data is automatically transmitted from the first wireless device to the second wireless device.

DESCRIPTION OF EXAMPLE EMBODIMENTS

Different types of data may be sent to different recipients based on one or more criteria. In some embodiments, data transmission may be controlled by distances between the sending wireless communication device and the receiving wireless communication devices. Receiving wireless devices within different distances from the sending wireless device are able to receive different types of data. Each type of data can only be received by receiving wireless devices within a specific distance from the sending wireless device. In some embodiments, data transmission may be controlled by identities of the receiving users. Wireless devices of different receiving users are able to receive different types of data. Each type of data can only be received by wireless devices of specific users. In some embodiments, data transmission may be controlled by both distances between the sending wireless communication device and the receiving wireless communication devices as well as identities of the receiving users. Each specific type of data can only be received by wireless devices of specific users when the wireless devices are within a specific distance from the sending wireless device.

Figure 1:
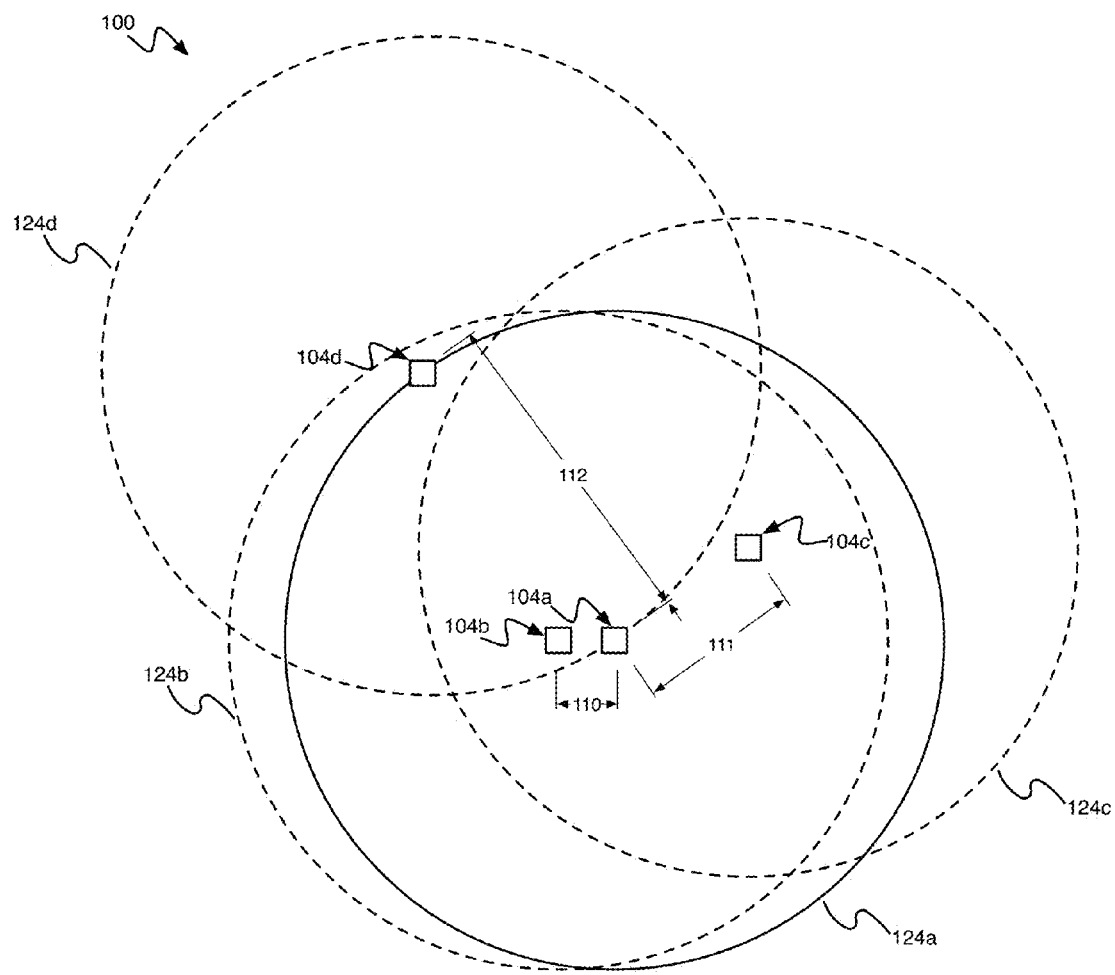
FIG. 1 illustrates an example wireless communications system.

FIG. 1 is a diagram of a communications system 100. The communication system 100 includes wireless communication devices 104a, 104b, 104c and 104d. The first wireless communication device 104b is a first distance 110 from the primary wireless communication device 104a. The second wireless communication device 104c is a second distance 111 from the primary wireless communication device 104a. The third wireless communication device 104d is a third distance 112 from the primary wireless communication device 104a. In a conventional wireless communications system, the wireless communication devices 104b, 104c and 104d are within a range of communication 124a of the primary wireless communication device 104a, and if data sharing is enabled on the primary wireless communication device 104a, then all wireless communication devices 104b-104d within the range of communication 124a have access to the same data.

The range of communication 124a may depend on the wireless technology for data transmission used by the primary wireless communication device 104a. Examples of wireless communications technologies include Near Field Communications (NFC), Bluetooth, WiFi, and a cellular network such as GSM, 3G, 4G or LTE. If a wireless communication device 104b-104d is inside the communication range 124a of the primary wireless communication device 104a, then the wireless communication devices 104b-104d can exchange data with the primary communication device 104a. The first distance 110 between the primary communication device 104a and the first communication device 104b is the shortest, and in some embodiments, this would allow communication between the wireless communication devices 104a and 104b at the highest available throughput. The second distance 111 is greater than the first distance 110, and thus the second wireless communication device 104c may have a lower available throughput. However, since the second wireless communication device 104c is within the communication range 124a, the second wireless communication device 104c maintains access to the same data as the first wireless communication device 104b. Furthermore, the third distance 112 is greater than the second distance 111, so the third wireless communication device 104d may have the lowest available throughput. However, since the third wireless communication device 104d also remains within the communication range 124a, the third wireless communication device 104d maintains access to the same data as the first 104b and second 104c wireless communication devices. In one example, these embodiments would be typical of a WiFi system in which the communication ranges 124a, 124b, 124c, and 124d have a radius of about one hundred meters and the distances 110, 111, and 112 are less than about 100 meters in an indoor and/or multipath environment.

According to various embodiments, the wireless communication devices 104a-104d may include one more mobile phones, iPhones, headphones, headsets (including a microphone and earphone), music players, iPods, personal digital assistants, iPads, laptops, computers, tablet computers, or cameras.

Figure 2:
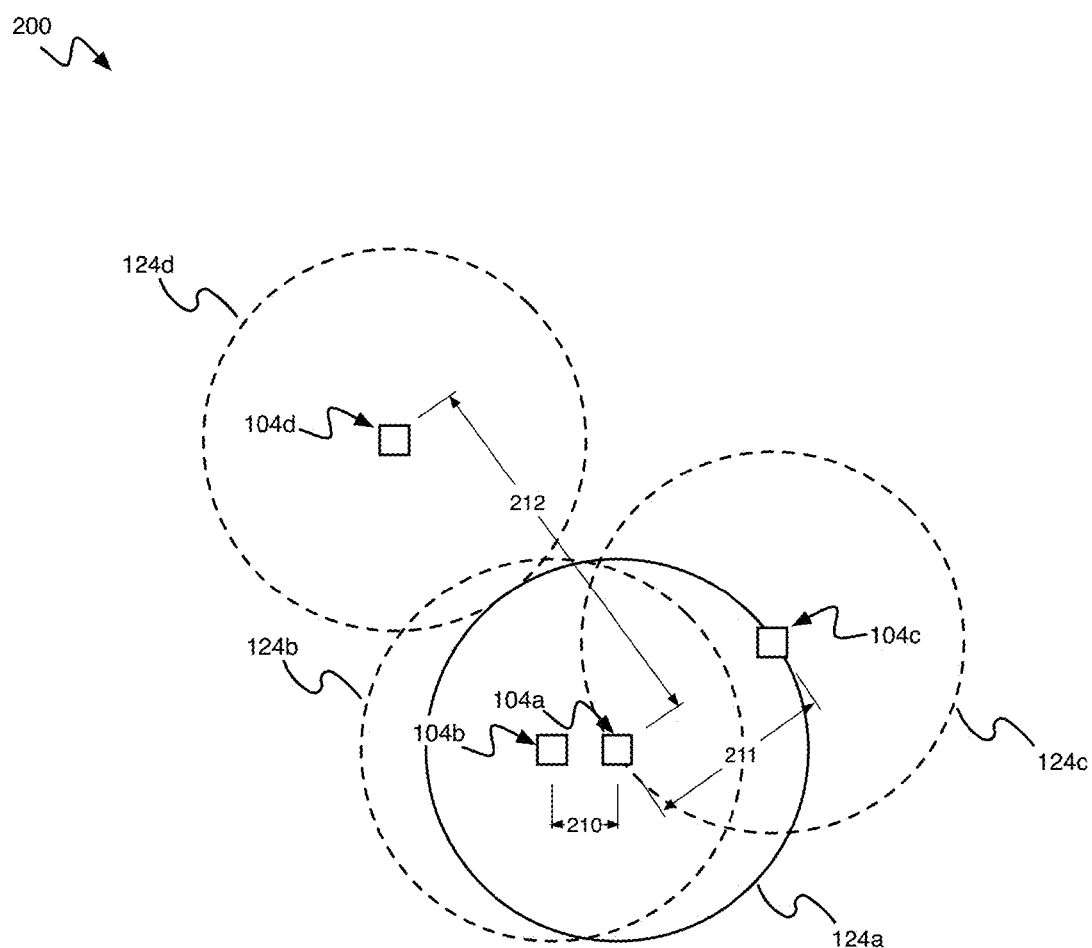
FIG. 2 illustrates an example wireless communications system including wireless devices positioned at different distances.

FIG. 2 is a diagram of a communications system 200. The wireless communication devices 104b, 104c, and 104d are at different distances 210, 211 and 212 from the user 104a. As shown in FIG. 2, the third wireless communication device 104d is unable to communicate with the primary communication device 104a since the distance 212 between the communication devices 104a and 104d is too large and the primary communication range 124a does not overlap with the third communication range 124d. The wireless communication devices 104b and 104c are within the communication range 124a, and are able to communicate with the communication device 104a, as described above with respect to FIG. 1. In this embodiment, the third wireless communication device 104b is not able to access information from the primary wireless communication device 104a due to a distance-dependent threshold in communication.

Figure 3:
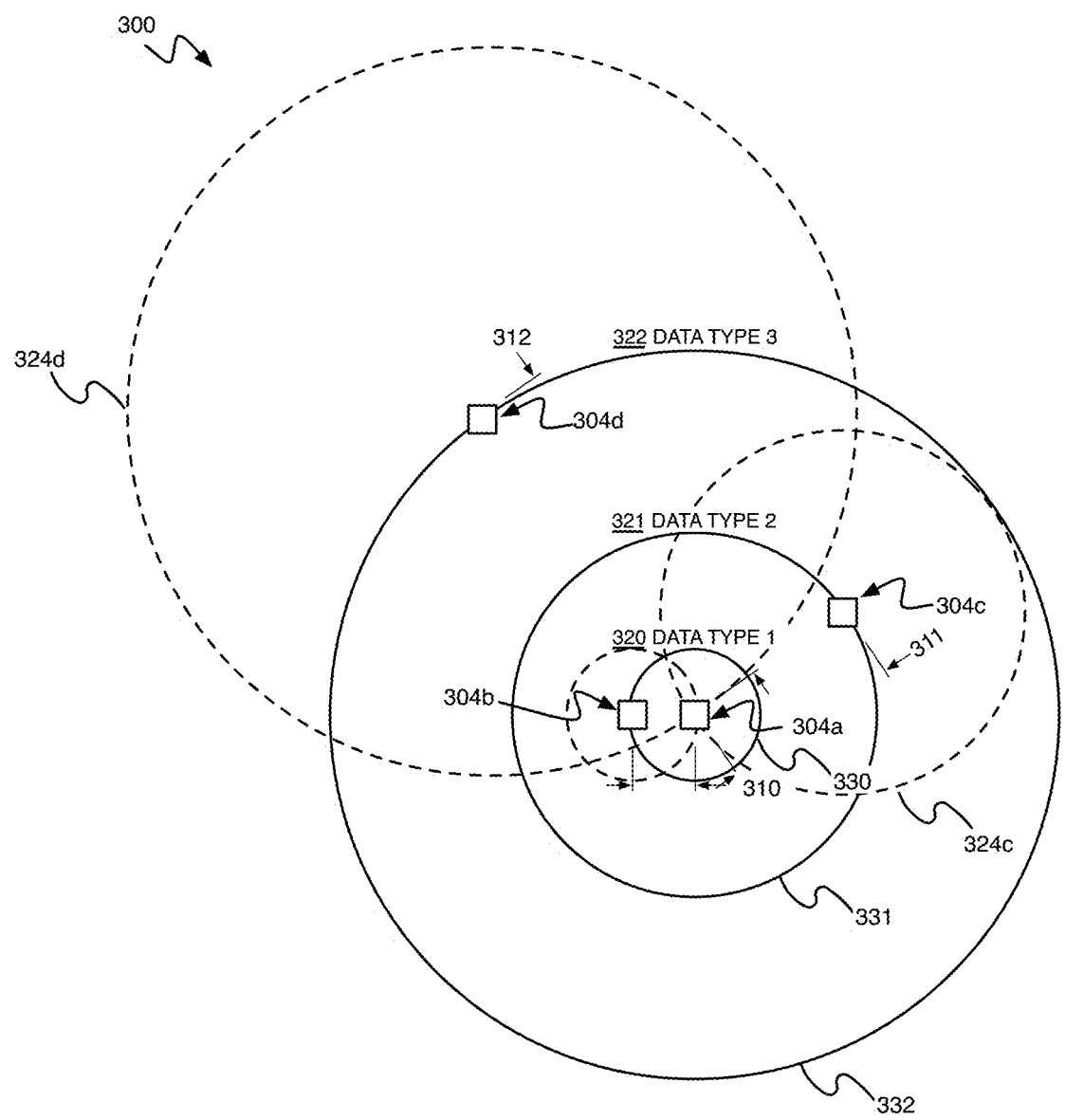
FIG. 3 illustrates an example wireless communications system for wirelessly transmitting data between wireless devices.

FIG. 3 is a diagram of a communications system 300 according to one embodiment. According to one aspect, the communication device 304a simultaneously transmits multiple data streams each having different types of coded data. The communication device 304a has three levels of communication ranges, 330, 331, 332. The communication range 330 includes transmitted data included in the first data type 320. The communication range 331 includes transmitted data included in the second data type 321. The communication range 332 includes transmitted data included in the third data type 322. The type of data that may be transmitted from the primary communication device 304a depends on the distance between the primary communication device 304a and the device to which it is attempting to transmit data. For example, data included in the first data type 320 may be transmitted to devices within the first communication range 330, data included in the second data type 321 may be transmitted to devices within the second communication range 331, and data included in the third data type 322 may be transmitted to devices within the third communication range 332.

In some embodiments, the data types 320, 321 and 322 may be transmitted simultaneously on different radios operating at different electromagnetic wavelengths, different antennas, and/or different modulation, demodulation and encoding formats. Different modulation, demodulation and encoding formats may be used to minimize the hardware complexity of the primary wireless communication device 304a. In one example, the first wireless communication device 304b at communication distance 310 has access to the first data type 320, the second data type 321 and the third data type 322. The second wireless communication device 304c at communication distance 311 has access to the second data type 321 and the third data type 322. The third wireless communication device 304d at communication distance 312 has access to the third data type 322. The user of the primary wireless communication device 304a may control the type of information provided at each data type level 320, 321 and 322. In one example, the user interface of the wireless communication device 304a may be designed to allow the user to control the type of information available at each data type level 320, 321 and 322.

In FIG. 3, the communication range 330 is shorter than the communication range 331, which in turn is shorter than the communication range 332. In some embodiments, when the first data type 320 is transmitted from the communication device 304a, only the communication device 304b can receive it because only the communication device 304b is within the communication range 330. However, when the second data type 321 is transmitted from the communication device 304a, both of the communication devices 304b and 304c can receive it because both of the communication devices 304b and 304c are within the communication range 331. Similarly, when the third data type 322 is transmitted from the communication device 304a, all three of the communication devices 304b, 304c, and 304d can receive it because all three of the communication devices 304b, 304c, and 304d are within the communication range 332.

In some embodiments, the information provided in the first data type 320 may be more private or secure than information provided in the second data type 321, and the information provided in the second data type 321 may be more private or secure than information provided in the third data type 322. In accordance with one embodiment of the invention, the radius 310 of the first communication range 330 may be less than about one meter and the first data type 320 may be very personal information such as private social networking identifying information, contact information, private documents and files, or URLs to personal or public information on the internet. The data included in the first data type 320 may be information that the user of the primary communication device 304a intentionally shares specifically with the user of the first communication device 304b. To further improve security, users of the wireless communication devices 304a and 304b enable exchange of information in the first data type 320 only after first sharing other information such as device orientation, inertial signatures, passwords, PINs (personal identification numbers), NFC, or RFID data exchange. In one example, the first wireless communication device 304b may be another wireless device owned by the user of the primary communication device 304a such as a watch, pedometer, heart rate monitor, fitness equipment or headphones, or any combination of these.

In one embodiment, the radius 311 of the second communication range 331 may be less than three meters and the second data type 321 may be personal information that the user of the primary communication device 304a intends to share with a group of people. For example, the information in the second data type 321 may be social networking group or friend information, contact information, documents, and/or files or URLs to personal or public information on the internet. The information in the second data type 321 may be information that is often inefficiently shared at business meetings and social gatherings.

The radius 312 of the third communication range 332 may be greater than ten meters and the third data type 322 may be public information that the user of the primary communication device 304a intends to share broadly in a large public setting. For example, the information included in the third data type 322 may be information the user of the primary communication device 304a intends to share with other communication devices in a classroom, lecture hall, airplane, restaurant or bar, urban outdoor environment, and/or mall. In another example, the information in the third data type 322 may be information the user of the primary communication device 304a would like to share with any device within the selected range, such as any device within ten meters of the primary communication device 304a while the user ambulates outside.

Figure 4:
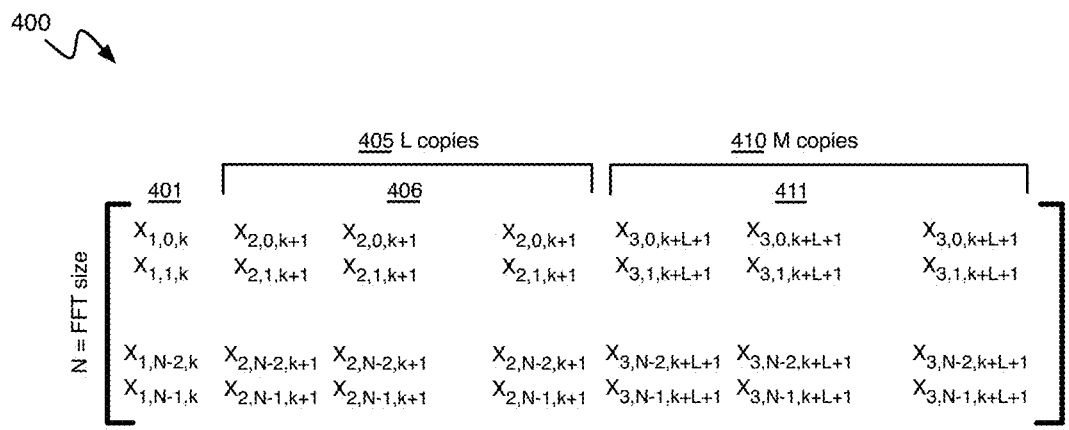
FIG. 4 illustrates an example data encoding matrix.

FIG. 4 is a diagram of an embodiment of a data encoding matrix 400 that may be used to create the three different data types 320, 321 and 322 shown in FIG. 3. FIG. 4 shows a matrix of the three data types 320, 321 and 322 in bits that may be fed into a transmitter, such as an Orthogonal Frequency Division Multiplexing (OFDM) transmitter. The first data type 320 is represented in first column 401, the second data type 321 is represented in a second set of columns 406, and the third data type 322 is represented in a third set of columns 411.

Referring to FIG. 4, the first data type 320 is shown as a first column 401 vector of N bits. The second data type 321 is shown as L redundant copies 405 of one column vector of the second set of columns 406. The third data type 322 is shown as M redundant copies 410 of one column vector of the third set of columns 411. According to one example, if the entries in the second set of columns 406 are all identical, the bandwidth of the second data type 321 can be reduced to N×L times lower than the bandwidth of the first data type 320. According to one feature, as shown in FIG. 3, the third data type 322 is broadcast at a longer range than the second data type 321, and, referring to FIG. 4, the number of redundant copies 410 (M) of the third data type 322 is larger than the number of redundant copies 405 (L) of the second data type 321.

According to one embodiment, a data stream from a wireless communication device is a continuous stream of matrices 400. In the matrix 400, k represents the time index. A transceiver in the wireless communication device includes an encoding module that may use an OFDM encoding method. The OFDM encoding method converts a parallel bit stream to a set of orthogonal signals. The transceiver simultaneously transmits the set of orthogonal signals. In one example, the transceiver includes a linear analog transmitter that performs the simultaneous transmission of the set of orthogonal signals. According to one embodiment, the set of orthogonal signals is created using non-overlapping or minimally-overlapping signals in the frequency domain, resulting in orthogonal frequency data. A Fast Fourier Transform (FFT) may be used to convert the superposition of orthogonal frequency data into the time-domain.

In one embodiment, distance-dependent data is generated by adjusting the bandwidth of a bit of data for each data type. For example, the shortest distance data type, the first data type 320, uses a high bandwidth, while the longest distance data type, the third data type 322, uses a low bandwidth. In one embodiment, the bandwidth may be reduced by making redundant copies of the same bit and designing the receiver to integrate or average the signals. The low bandwidth signal used for the third data type 322 allows the data to be received at a distance further from the transmitter. The signals may be averaged in the time domain or the signals may be averaged in the frequency domain. In one example, the receiver has information about which receiver signals to average. The information about which signals to average may have been previously shared with the wireless communication device to which the transceiver will transmit the data or from which it is receiving a signal. In another embodiment, distance-dependent data is generated by adjusting the transmit power for each data type.

In one embodiment, the data in the matrix 400 may be more interleaved than is shown in FIG. 4. In other embodiments, the data in the matrix 400 may be represented in different encodings or modulation formats to minimize latency or optimize some other system parameter. In a further embodiment, the value of L (the number of copies 405) and the value of M (the number of copies 410) may be fixed a priori information shared across the wireless communications devices 304a, 304b, 304c and 304d. In another embodiment, the value of L (the number of copies 405) and the value of M (the number of copies 410) may be broadcast as third data type 322 information or by means of another wireless protocol with a longer range.

Figure 5A:
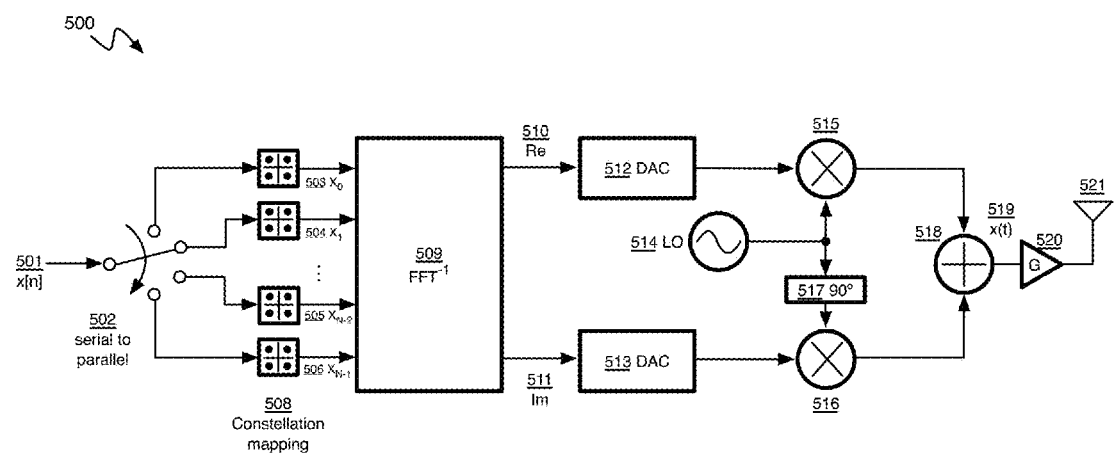
FIG. 5A illustrates an example orthogonal frequency division multiple access (OFDM) transmitter.
Figure 5B:
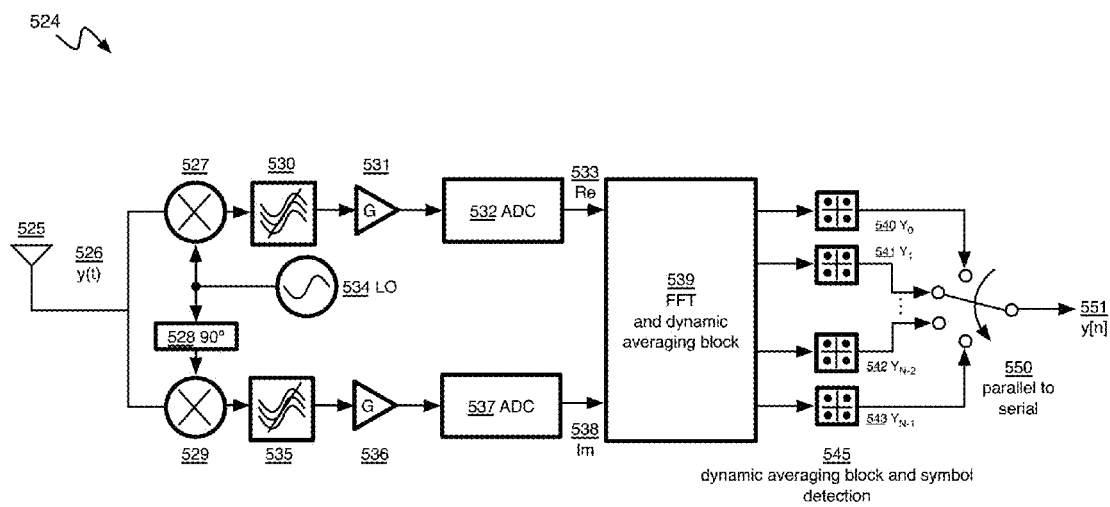
FIG. 5B illustrates an example OFDM receiver.

FIG. 5A is a diagram of an OFDM transmitter 500 according to an embodiment, and FIG. 5B is a diagram of an OFDM receiver 524 according to an embodiment. According to one aspect, an OFDM transceiver includes the OFDM transmitter of FIG. 5A and the OFDM receiver of FIG. 5B.

Referring to FIG. 5A, an incoming data stream x[n] 501 may be, for example, a serialized version of the matrix shown in FIG. 4. The incoming data stream x[n] 501 is converted into multiple parallel data streams 502, and a constellation mapping 508 is used to map the parallel data streams 502 to a constellation of orthogonal signals 503, 504, 505, and 506. In one example, the orthogonal signals 503-506 may be modulated using QAM (Quadrature Amplitude Modulation) or PSK (Phase Shift Keying).

The orthogonal signals 503-506 are converted to time domain signals using an inverse Fast Fourier Transform 509

(FFT). The FFT 509 produces a complex time-series signal including a real signal component 510 and an imaginary signal component 511. The real signal component 510 is input converted to an analog signal at a first digital-to-analog converter 512, and the imaginary signal component 511 is converted to an analog signal at a second digital-to-analog converter 513. The real signal component 510 is then converted to the radiofrequency (RF) domain via a first mixer 515 and the imaginary signal component 511 is converted to the radiofrequency domain via a second mixer 516. The mixers 515 and 516 receive a local oscillator signal from the local oscillator 514, and multiply the local oscillator signal by the respective real and imaginary complex time series signals. In one example, the local oscillator signal is in the range of about 2.45 GHz, and the output from the transmitter is WiFi or another microwave frequency. The real 510 and imaginary 511 components are combined at 518 to produce the output signal x(t) 519. The output signal x(t) 519 is amplified by amplifier 520 and radiated by an antenna 521 as microwave electromagnetic fields. In one example, the matrix 400 in FIG. 4 may be fed into the transmitter 500 column-by-column to transmit the various data types.

Referring to FIG. 5B, the receiver 524 includes an antenna 525 that converts electromagnetic fields to a voltage signal y(t) 526. The voltage signal y(t) may be an attenuated and distorted version of an output signal from another wireless communication device, similar to the output signal x(t) 519 of the transmitter. The attenuation and distortion of the output signal as received at the receiver 524 may be caused by path loss and/or scattering in the environment. The received voltage signal y(t) is divided into two parallel input signals and input into mixers 527 and 529. The mixers 527 and 529 convert the parallel input signals to baseband using a local oscillator 534. Baseband filters 530 and 535 filter out the double frequency component of each parallel input signal. The output from the baseband filters 530 and 535 is amplified at amplifiers 531 and 536, and then the complex analog time-series input signals are converted to the digital domain with analog-to-digital converters 532 and 537.

The complex digital time-series input signals are processed by the FFT 539. In one embodiment, the FFT 539 averages the samples in the complex digital time-series input signals according to a shared a priori knowledge of the indices L and M, as discussed above with respect to FIG. 4. In one example, the FFT 539 includes sufficient memory to store received samples for averaging. According to one example, the matrices are framed. The FFT 539 outputs orthogonal signals that are converted to symbols by the symbol detection block 545. In another embodiment, the symbol detection block 545 averages the samples in the complex digital time-series input signals according to a shared a priori knowledge of the indices L and M, as discussed above with respect to FIG. 4. The symbol detection block 545 may include sufficient memory to store received samples for averaging. According to one feature, the averaging performed by the FFT 539 or the symbol detection block 545 results in a processing gain, allowing for the use of a smaller bandwidth for a longer range. After appropriate averaging, the symbol detection block 545 detects the symbols and converts the signals to bits. The multiple parallel orthogonal signals 540-543 are converted from parallel to a serial stream of bits y[n] 551.

Figure 5C:
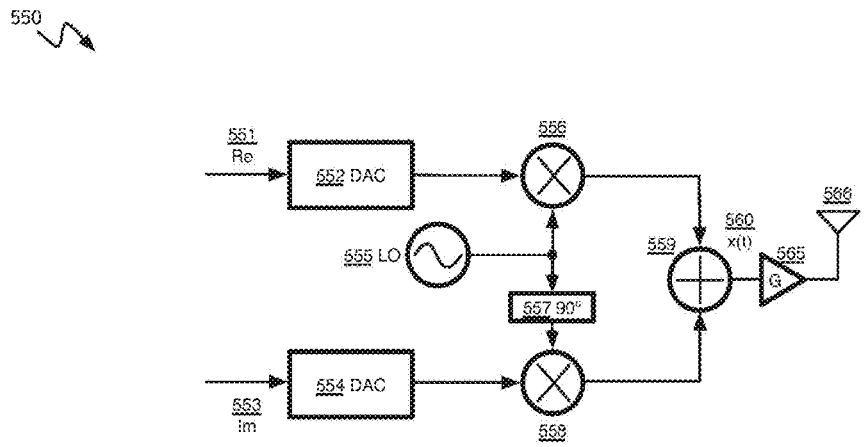
FIG. 5C illustrates an example simple superheterodyne transmitter.
Figure 5D:
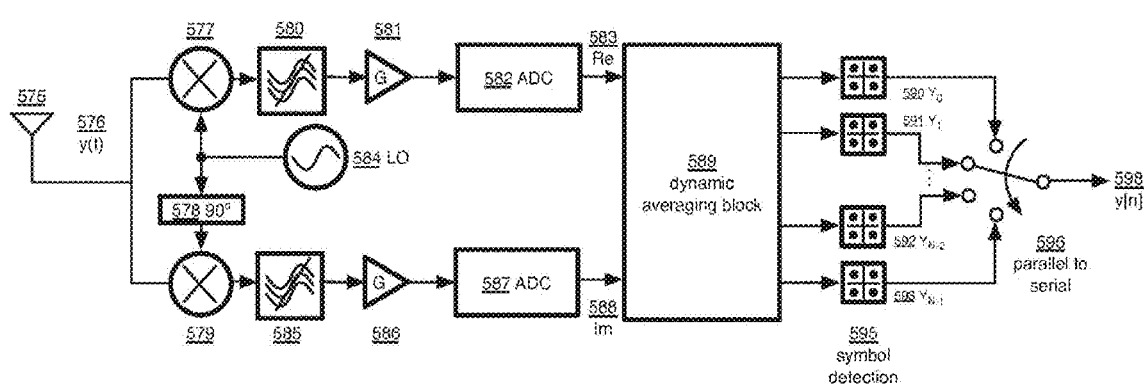
FIG. 5D illustrates an example simple superheterodyne receiver.

In some instances, radios may have transceiver architectures that are simpler than OFDM. Examples include RFID at UHF and microwave frequencies, Bluetooth Low Energy 4.0, Bluetooth 1.0, 1.1, 1.2, 2.0, 2.1 (Classic Bluetooth), the earlier WiFi protocols (802.11b and g) and proprietary 433, 900 MHz and 2.4 GHz radios. In these instances, the size of the orthogonal basis set may be smaller, and therefore the encoding for distance-dependent communications may be different. For example, if the modulation is done with ASK, FSK (including GFSK, DQPSK and DPSK), the distance-dependent coding may be done with repetition codes, dynamically changing rate codes, or other codes. FIGS. 5C and 5D illustrate a conventional radio architecture which may be used for active radio systems that are not based on RFID (the complexity of the RFID antenna arrangement for transmit 566 and receive 575 are different, but not shown in these figures for sake of simplicity). For the transmitter 550, digital samples representing baseband modulation in the real 551 and imaginary domain 553 are fed into DACs 552 554 which are then modulated with a local oscillator 555, mixers 556 558, and a phase shifter 557 and then combined 559 to produce a complex RF signal 560. This signal can then be amplified 565 and radiated 566. The baseband samples 551 553 may correspond to samples that compose repetition or modulation rates codes for each distance-dependent communication range. Upon reception of a radiated signal at the antenna 575, a complex RF signal 576 is demodulated and filtered by components 577 578 579 580 584 585. The analog signal is amplified 581 586 and then digitized 582 587. If a repetition code or similar coding scheme is utilized, a dynamic averaging block 589 may be used to assemble larger symbols from individual samples or chips. If a different modulation rate is used, the dynamic averaging block 589 may choose larger symbols to apply an appropriately-sized matched filter or other filter. Finally, a symbol detection block 595 extracts bits from the sequence, which may then be converted into a bit stream in memory.

Figure 6:
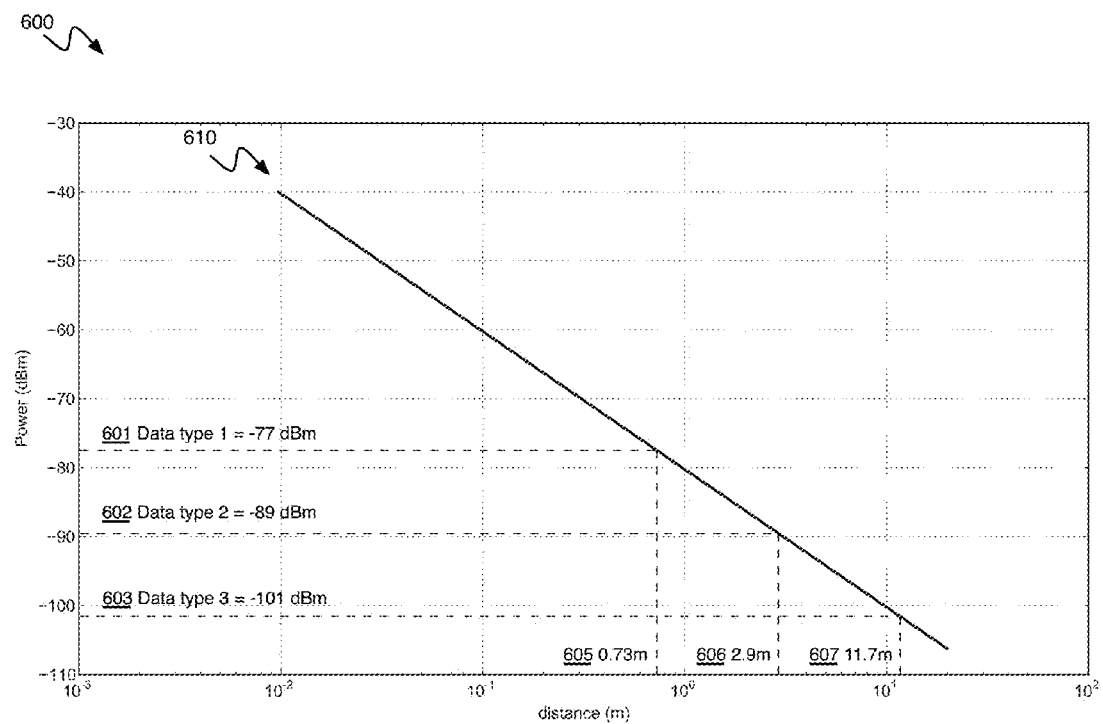
FIG. 6 illustrates transmit power at various distances.

FIG. 6 is a diagram showing the transmit power at various distances for a matrix such as that shown in FIG. 4 with N×L=16 and N×M=256. The combined transmit power and antenna gain of the originating wireless communication device's transmitter is set to −40 dBm, allowing for communication of the first data type 601 at a first distance d1 605 (0.73 m), communication of the second data type 602 at a second distance d2 606 (2.9 m), and communication of the third data type 603 at a third distance d3 607 (11.7 m) with a 300 Mbit/s OFDM transceiver. Communication of different data types at different distances may be enabled digitally if, for example, the transmitter has sufficient dynamic range. In another example, communication of different data types at different distances may be enabled digitally with an analog attenuator in the transmit chain. According to one feature, the low power level may be selected to ensure privacy. For example, if users of other wireless communication devices do not change the temperature of their receivers or employ enormously large, conspicuous antennas, it is thermodynamically not possible to decode data beyond a certain range. This is because, according to equation (1) below, there is a minimum signal to noise ratio beyond which no information can be reliably obtained:

$$SNR_{min\_in\_dB} = 10 \log_{10} k_B T + 10 \log_{10} BW + EB/N_{oBER} + NF + IL_{modulation}. \quad (1)$$

The first term represents the noise floor in the channel based on the thermodynamics of operating a receiver at a particular temperature. The second term represents how much of the channel is utilized as bandwidth for integrating the noise power. The third term is the theoretical signal to noise ratio in dB for a specific bit error rate (BER) and modulation format. The theoretical signal to noise ratio for a specific BER and modulation format is −1.6 dB at the Channel capacity limit, but is otherwise a positive number. The fourth term represents an implementation loss in the analog domain of a circuit corresponding to the noise temperature of the receiver and is typically in the range of about 0.5-20 dB. The last term is a digital implementation loss corresponding to, for example, finite dynamic range, computational power, distortion/interference and timing errors. The digital implementation loss varies from about 0.5-10 dB in typical systems. Given that NF and IL are positive numbers, the variables under a receiving user's control are temperature and the receiving user's receiving antenna gain. Otherwise, the minimum power required to properly decode information from a transmitter may be used as a means of guaranteeing physical access to the various data types.

According to one feature, the −77 dBm limit for the first data type 601 is the minimum receiver power of typical 802.11n radios on the market that transmit at 300 mbit/s. The other data type power levels and ranges are determined from this data point using the Friis transmission equation, represented by the curve 610. According to one embodiment, the ranges discussed with respect to Equation (1) may change slightly due to scattering. In another embodiment, the transmitter power may be higher, but the protocol ensures that the receiver power threshold is set above the corresponding limit.

In some embodiments, different types of data are transmitted at different power levels so that the signals can only reach specific and different distances (e.g., due to ambient temperature or noise ratio). For example, in FIG. 3, the first data type 320 may be transmitted at a lower power level so that the signals only reach a short distance (e.g., the communication range 330). The second data type 321 may be transmitted at a somewhat higher power level so that the signals can reach a somewhat longer distance (e.g., the communication range 331). The third data type 322 may be transmitted at an even higher power level so that the signals can reach a farther distance (e.g., the communication range 332). These power levels may be dynamically controlled by a power amplifier, or using the dynamic range of the digital to analog converters.

Figure 7:
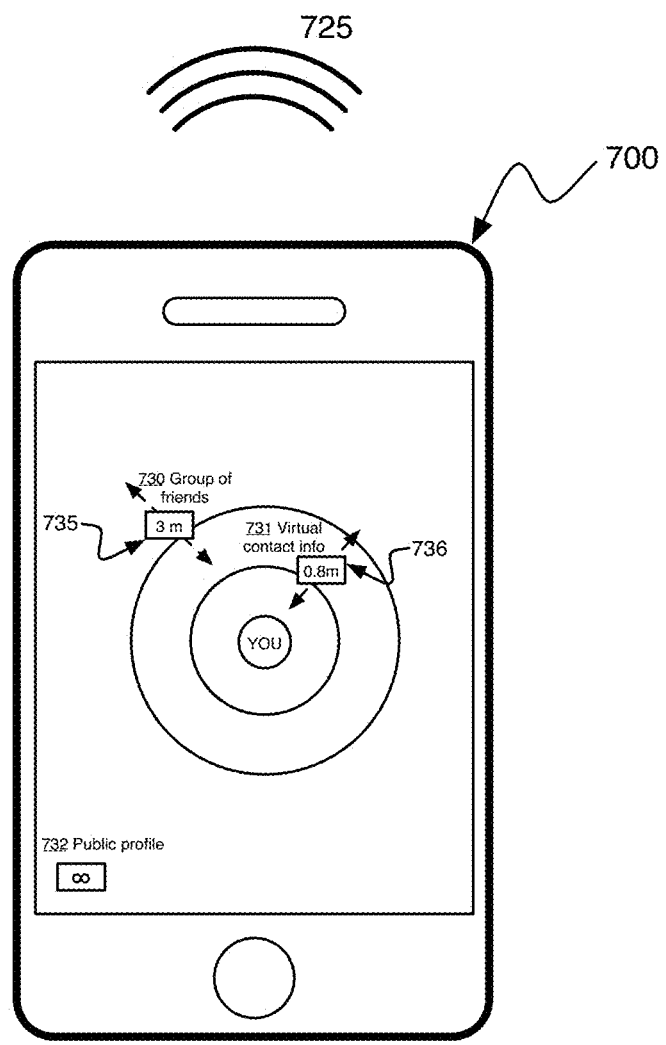
FIG. 7 illustrates an example user interface for controlling transmission ranges.

FIG. 7 is a diagram of a user interface element that may be used to control the communication ranges for the different data types on a mobile communication device. The user can control the zones of communication 725 corresponding to the first data type and the second data type. According to one embodiment, the third data type may be broadcast using the same radio, and the third data type may also be broadcast widely using WAN technology connected to the internet such as a cellular modem or WiFi. Thus, the communication range of the third data type may be considered as infinite or global. As shown in FIG. 7, the range of the first data type, shown here as Virtual contact info 731 has a control distance 736 that can be dynamically changed using a touch screen or other user interface control. The radius of communication may update live on the screen as a user changes this parameter. The user may also add or subtract the types of information that may be shared within the first distance 731. Similarly, the second data type, shown in FIG. 7 as Group of friends 730, has a control distance 735 that can be dynamically changed. In one embodiment, a set of profiles for various social settings may be defined by a user and the user may switch between the settings, or the communication device may automatically switch setting based on location-awareness.

Figure 8:
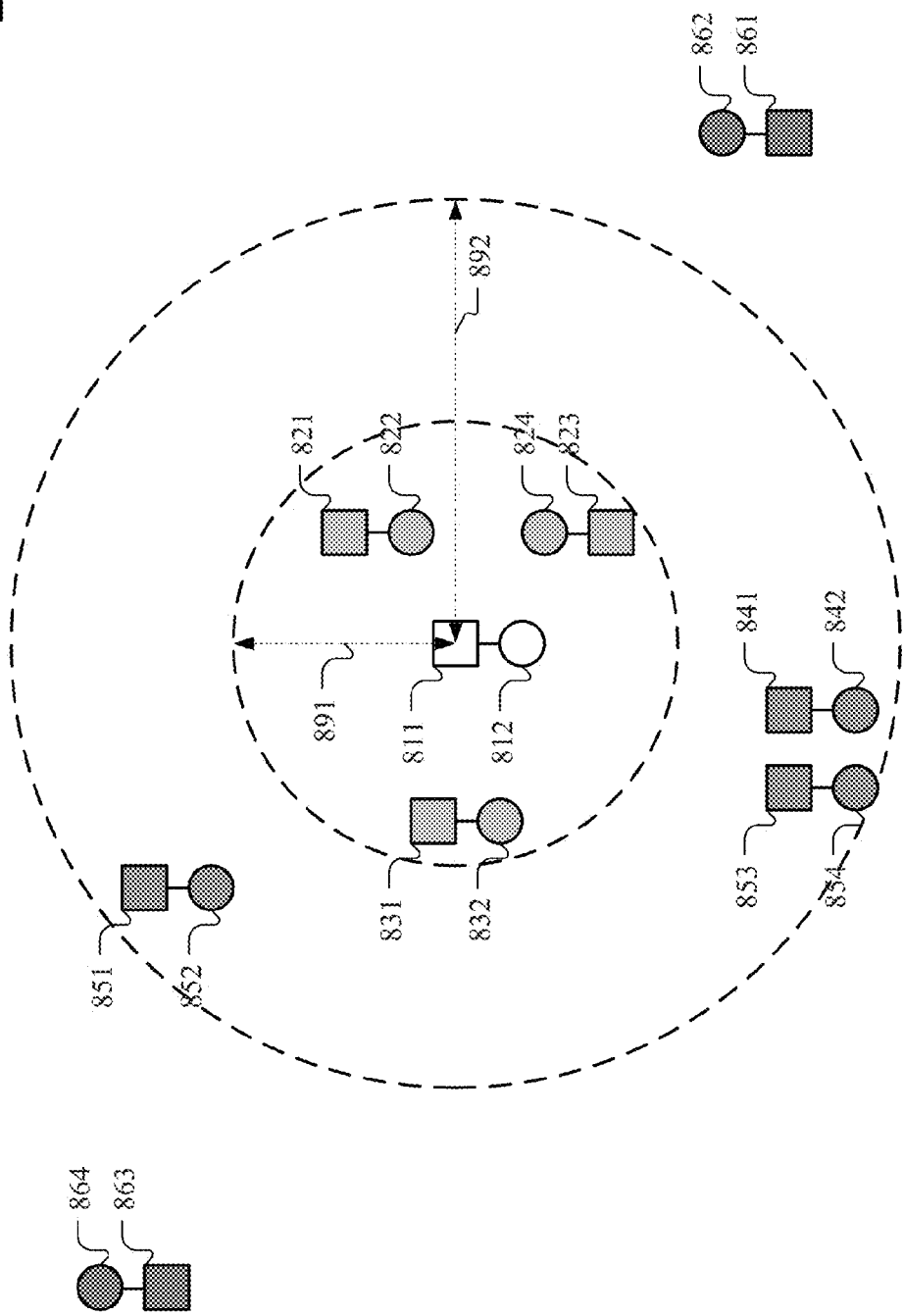
FIG. 8 illustrates an example wireless communications system for wirelessly transmitting data between wireless devices.

In some embodiments, data transmission may be controlled by or based on users associated with the wireless communication devices (i.e., to whom the wireless communication devices belong) either in addition to or instead of distances between the wireless communication devices. FIG. 8 illustrates another example wireless communications system 800. Suppose that a wireless device 811 is associated with a user 812. User 812 will send data using his wireless device 811. Thus, in this example, user 812 is the sending user and wireless device 811 is the sending wireless device. The other users and devices in system 800 are the receiving users and devices.

In some embodiments, data transmission may be solely controlled by or based on identities of the users associated with the wireless communication devices. Suppose that user 812 specifies (e.g., through a user interface provided on wireless device 811) that a first type of data should only be received by users 822 and 842, or more specifically by wireless devices belonging to users 822 and 842. Wireless device 821 is associated with user 822, and wireless device 841 is associated with user 842. User 812 may also specify that a second type of data should only be received by wireless devices belonging to users 822 and 824. Wireless device 823 is associated with user 824.

In this case, when the first type of data is transmitted by wireless device 811, only wireless device 821 associated with user 822 and wireless device 841 associated with user 842 can receive it. All the other wireless devices are unable to receive the first type of data. When the second type of data is transmitted by wireless device 811, only wireless device 821 associated with user 822 and wireless device 823 associated with user 824 can receive it. All the other wireless devices are unable to receive the second type of data.

Here, data transmission is solely controlled by the identities of the users and their associated wireless devices. The distances between the sending and receiving wireless devices are not taken into consideration. For example, when the first type of data is transmitted by wireless device 811, even though wireless device 853 associated with user 854 is next to wireless device 841 associated with user 842, because user 854 is not authorized to receive the first type of data, wireless device 853 associated with user 854 cannot receive the first type of data. On the other hand, even though the distance between wireless devices 811 and 821 is much shorter than the distance between wireless devices 811 and 841, because both users 822 and 842 are authorized to receive the first type of data, both wireless devices 821 and 841 can receive the first type of data when it is transmitted by wireless device 811.

In some embodiments, data transmission may be controlled by or based on both the identities of the users associated with the wireless communication devices as well as the distances between the sending and receiving wireless devices. Suppose that user 812 specifies (e.g., again, through a user interface provided on wireless device 811) that a third type of data should only be received by wireless devices belonging to users 822 and 824 when they are within a specific distance 891 from wireless device 811. User 812 may further specify that a fourth type of data should only be received by wireless device belonging to user 854 when it is within a specific distance 892 from wireless device 811. Wireless device 853 is associated with user 854. In addition, distance 892 is further away from wireless device 811 than distance 891.

In this case, when the third type of data is transmitted by wireless device 811, only wireless device 821 associated with user 822 and wireless device 823 associated with user 824 can receive it. All the other wireless devices and users cannot receive it. When the fourth type of data is transmitted, only wireless device 853 associated with user 854 can receive it. All the other wireless devices and users cannot receive it.

Here, data transmission is controlled by both the identities of the users and the distances between the sending and receiving wireless devices. For example, when the third type of data is transmitted by wireless device 811, even though wireless device 831 is also within distance 891 from wireless device

811, because user 832 is not authorized to receive the third type of data, wireless device 831 associated with user 832 cannot receive the third type of data. As another example, when the fourth type of data is transmitted by wireless device 811, even though wireless devices 821, 823, 831, 841, and 851 are all within distance 892, because users 822, 824, 832, 842, and 852 are not authorized to receive the fourth type of data, their associated wireless devices 821, 823, 831, 841, and 851 cannot receive the fourth type of data.

Of course, in all of these scenarios, wireless device 861 associated with user 862 and wireless device 863 associated with user 864 cannot receive any type of data since users 862 and 864 are not authorized to receive any type of data and wireless devices 861 and 863 are not within the specified distances from wireless device 811 in order to receive any type of data.

With some implementations, different types of data may be encoded or encrypted differently before transmission. Given a specific type of data, only those users who are authorized receive that type of data have the appropriate means to decode or decrypt the data using their associated wireless devices. For example, for the first type of data, only wireless device 821 associated with user 822 and wireless device 841 associated with user 842 are capable of decoding or decrypting the first type of data. All the other wireless devices cannot decode or decrypt the first type of data. Similarly, for the second type of data, only wireless device 821 associated with user 822 and wireless device 823 associated with user 824 are capable of decoding or decrypting the second type of data. All the other wireless devices cannot decode or decrypt the second type of data.

Figure 9:
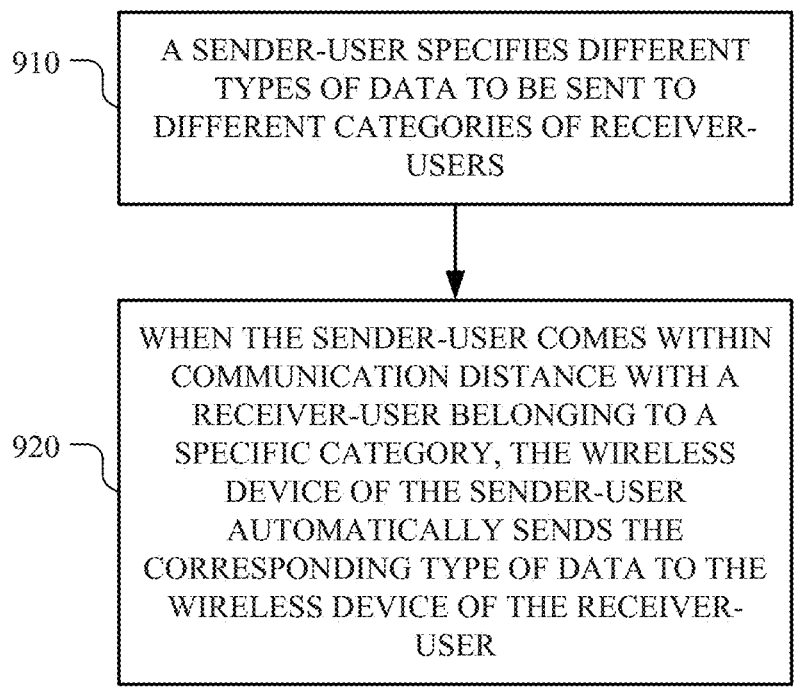
FIG. 9 illustrates an example method for sharing information amount specific users.

In particular embodiments, a user (i.e., a data sender) may specify how data should be shared ahead of time. FIG. 9 illustrates an example method 900 for sharing data among users. Method 900 may begin at step 910.

At step 910, a sender-user may specify different types of data to be sent to different categories of receiver-users. This may be done ahead of the time before the sender-user will meet with any receiver-users In some embodiments, a user interface (e.g., native or web-based user interface) may be provided on the wireless device of the sender-user, which enables the sender-user to specify which categories of receiver-users should receive which type of data. For example, the user interface may allow the sender-user to define a type of data (e.g., photos taken at a birthday party), and then specify which users can receive this type of data (e.g., users who have attended the birthday party). The sender-user may specify the receiver-users by their names, user or group identifiers (e.g., at a social-networking website), email addresses, mobile telephone numbers, or any other applicable means. In some embodiments, the sender-user and receiver-users may be members of a social-networking system. In this case, the sender-user may specify the receiver-users by social connections with the sender-user (e.g., users who are friends with the sender-user).

In some embodiments, the user interface also enables the sender-user to specify, for each type of data, how close the receiving wireless devices must be before they can receive that type of data. For example, given a type of data (e.g., photos taken at a birthday party), the sender-user may first specify the receiver-users (e.g., users who have attended the birthday party) and then specify the maximum distance between the sending wireless device of the sender-user and the receiving wireless devices of the receiver-users for which the type of data can be transmitted. This type of data can only be detected when a receiving wireless device is within the specified distance from the sending wireless device. In some embodiments, geo-fences (e.g., based on a Wi-Fi network at home or at the office) may be established to accomplish a similar result—a user may share data more broadly or completely freely within the bounds of the geo-fence.

In some embodiments, data may be shared in accordance with privacy settings associated with the social-networking system (either privacy settings of the sender-user or of the receiver user(s)). Such privacy settings for a user may be configured in any appropriate manner, such as, by way of example and not limitation: in accordance with a degree of separation between the sender-user and the receiver-user, in accordance with a whitelist or blacklist, based on the location of the user, based on the proximity of the user to other users or to a designated location, in accordance with date or time settings, based on groups with which the sender-user and/or the receiver-user are associated, based on interests of the sender-user and/or the receiver-user, or across all interactions for the user.

The data transmission specification may be saved on the wireless device of the sender-user or with the social-networking system for future use. Note that a category of receiver-users may only include a single receiver-user, as in the case where the sender-user wishes to send a specific type of data only to a single receiver-user.

At step 920, subsequently, when the sender-user comes within communication range with a receiver-user from a specific category of users, the wireless device of the sender-user automatically transmits the corresponding type of data for that category to the wireless device of the receiver-user.

With some implementations, the locations of the sender-user and receiver-users may be determined based on the locations of their respective wireless devices (e.g., through signal triangulation or GPS coordinates). Furthermore, when the sender-user and receiver-users are members of a social-networking system, information available with the social-networking system (e.g., check-ins, social connections, etc.) may also be used to determine when the sender-user and a receiver-user are within communication range or when to send the corresponding data.

In some embodiments, given a specific type of data, if the sender-user has specified both who is authorized to receive this type of data (i.e., the receiver-users) and how close the receiving wireless devices of the receiver-users must be from the sending wireless device of the sender-user (i.e., the maximum distance between the sending wireless device and the receiving wireless devices) before the receiving wireless devices can receive the type of data, then both conditions must be satisfied before a receiving wireless device of a receiver-user can receive the type of data. That is, only the wireless device of a receiver-user who is authorized to receive this type of data and only when the wireless device of that receiver-user is within the specified distance from the wireless device of the sender-user can receive this type of data.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
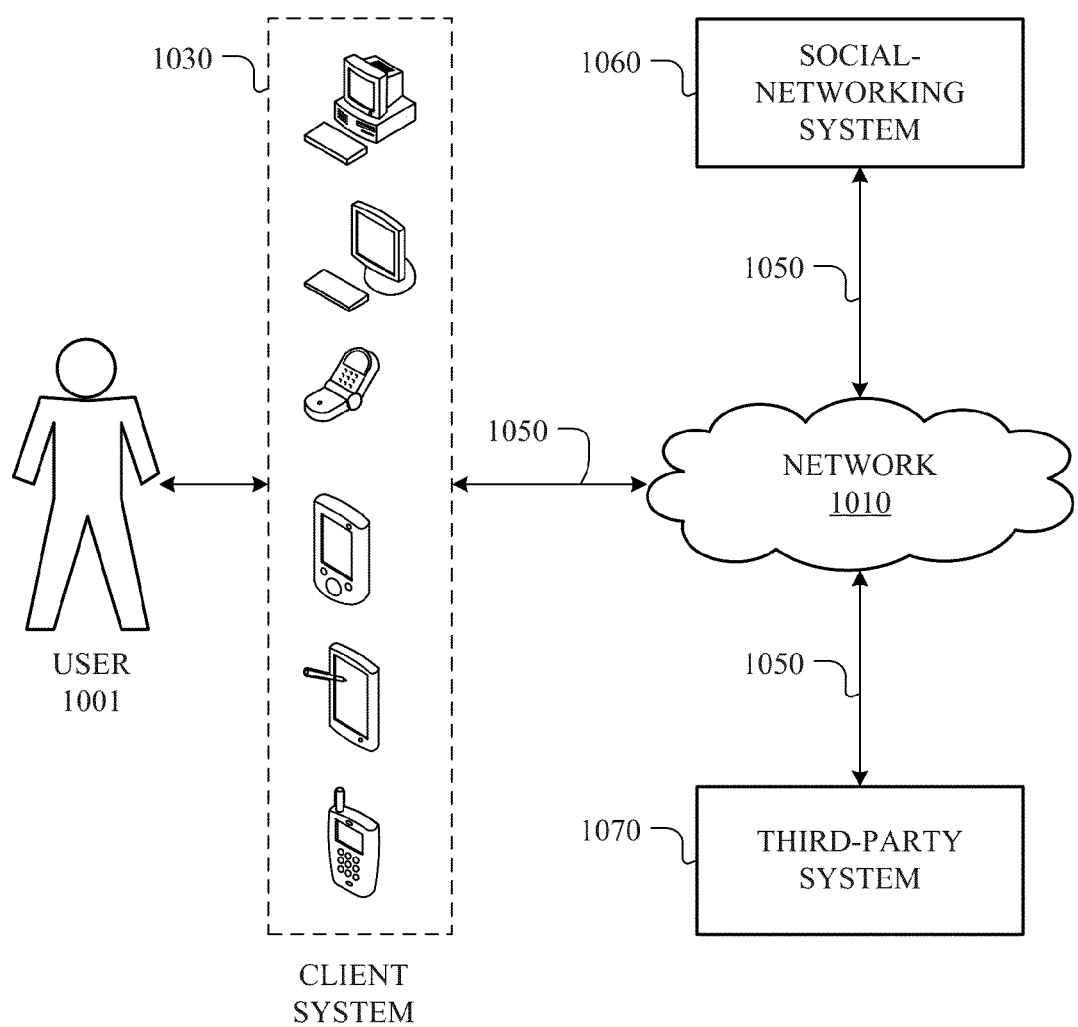
FIG. 10 illustrates an example social-networking system.

FIG. 10 illustrates an example network environment 1000 associated with a social-networking system. Network environment 1000 includes a user 1001, a client system 1030, a social-networking system 1060, and a third-party system 1070 connected to each other by a network 1010. Although FIG. 10 illustrates a particular arrangement of user 1001, client system 1030, social-networking system 1060, third-party system 1070, and network 1010, this disclosure contemplates any suitable arrangement of user 1001, client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of users 1001, client systems 1030, social-networking systems 1060, third-party systems 1070, and networks 1010, this disclosure contemplates any suitable number of users 1001, client systems 1030, social-networking systems 1060, third-party systems 1070, and networks 1010. As an example and not by way of limitation, network environment 1000 may include multiple users 1001, client system 1030, social-networking systems 1060, third-party systems 1070, and networks 1010.

In particular embodiments, user 1001 may be an individual (human user), an entity (e.g. an enterprise, business, or third-party application), or a group (e.g. of individuals or entities) that interacts or communicates with or over social-networking system 1060. In particular embodiments, social-networking system 1060 may be a network-addressable computing system hosting an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. In particular embodiments, social-networking system 1060 may include an authorization server that allows users 1001 to opt in or opt out of having their actions logged by social-networking system 1060 or shared with other systems (e.g. third-party systems 1070), such as, for example, by setting appropriate privacy settings. In particular embodiments, third-party system 1070 may be a network-addressable computing system that can host various functions. Third-party system 1070 may generate, store, receive, and send data. Third-party system 1070 may be accessed by the other components of network environment 1000 either directly or via network 1010. In particular embodiments, one or more users 1001 may use one or more client systems 1030 to access, send data to, and receive data from social-networking system 1060 or third-party system 1070. Client system 1030 may access social-networking system 1060 or third-party system 1070 directly, via network 1010, or via a third-party system. As an example and not by way of limitation, client system 1030 may access third-party system 1070 via social-networking system 1060. Client system 1030 may be any suitable computing device, such as, for example, a personal computer, a laptop computer, a cellular telephone, a smartphone, or a tablet computer.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

Figure 11:
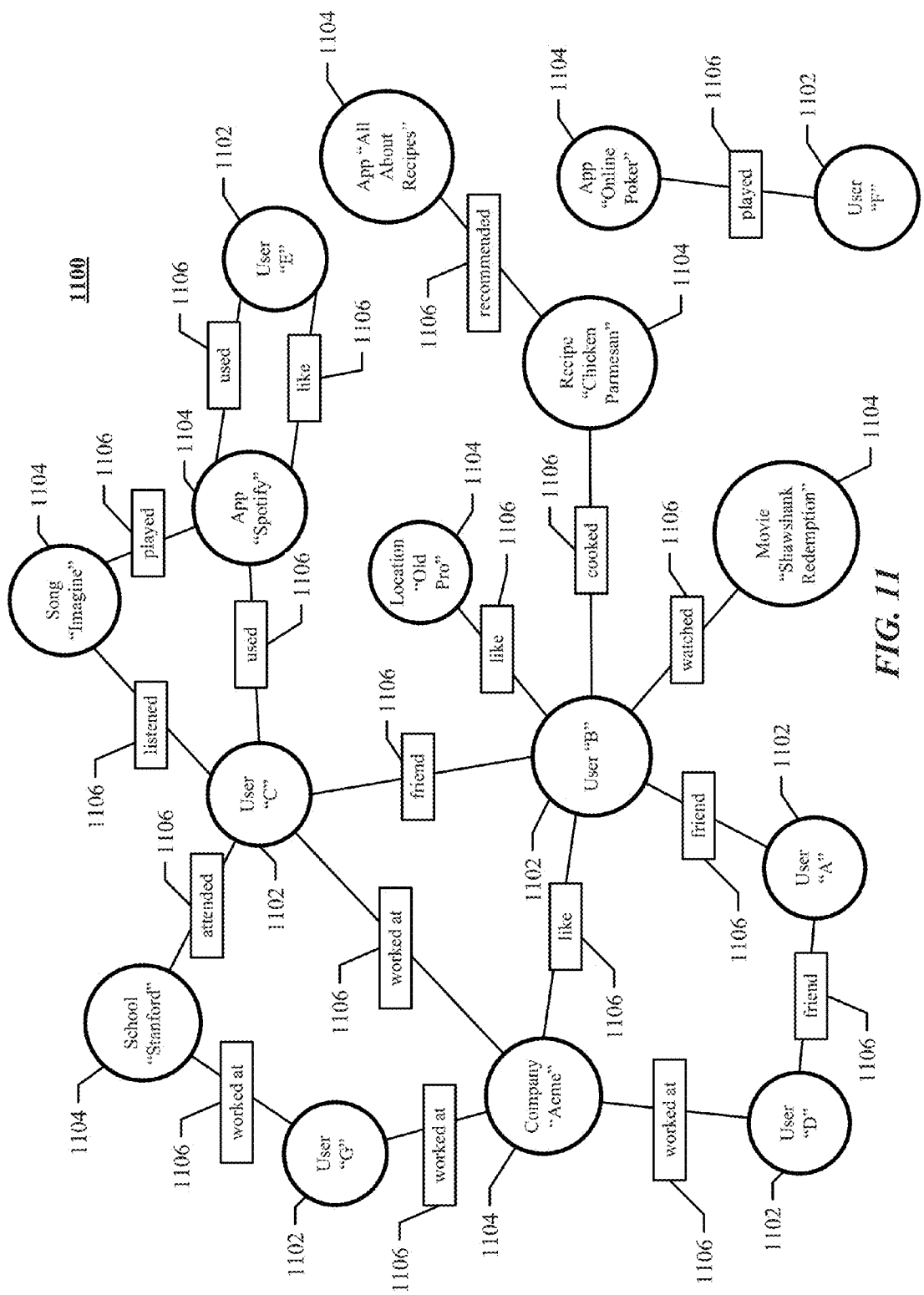
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060. Profile pages may also be hosted on third-party websites associated with a third-party server 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1070. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1030 to send to social-networking system 1060 a message indicating the user's action. In response to the message, social-networking system 1060 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information in one or more of data stores 24. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

Figure 12:
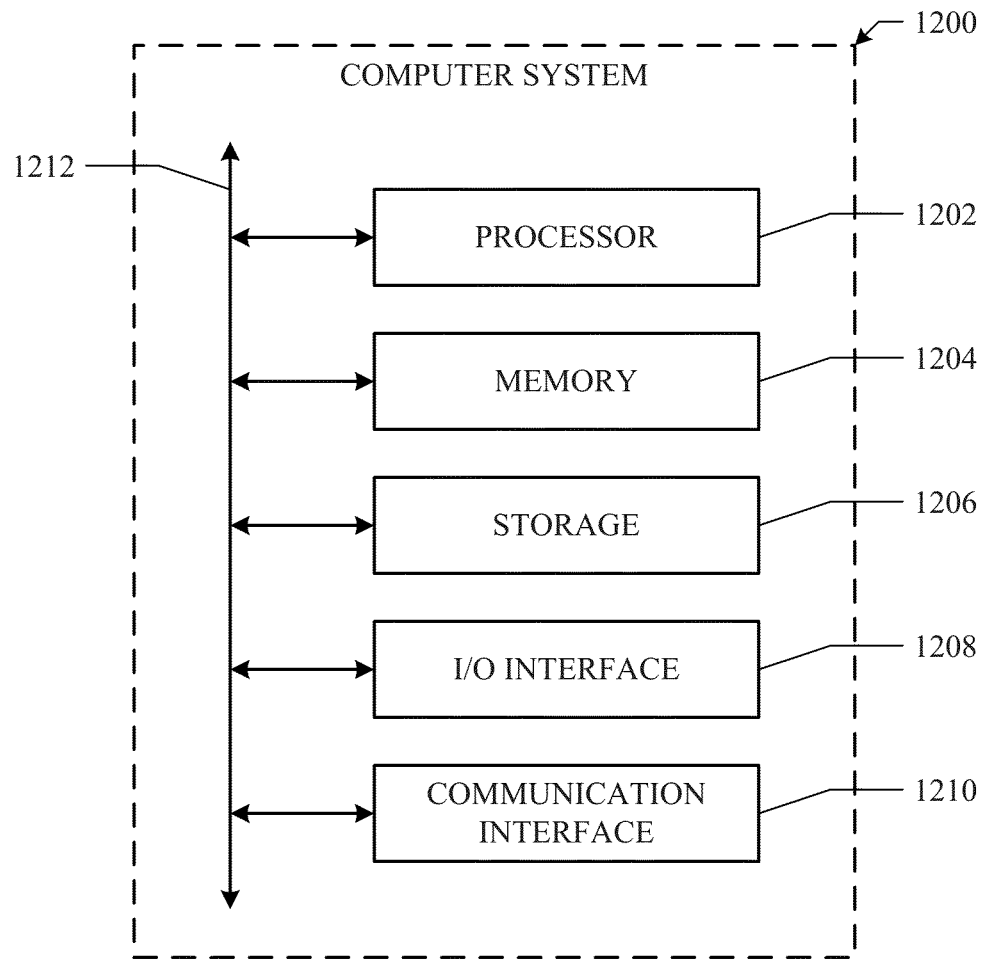
FIG. 12 illustrates an example computing device.

Various functionalities described above may be implemented as computer software and executed on an electronic or computer system. FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method comprising:
   by a first wireless device associated with a first user of a social-networking system, determining:
   a first data type;
   one or more users authorized to receive data of the first data type, the authorized users being members of the social-networking system, wherein each authorized user is determined based on one or more attributes of one or more edges between nodes in a social graph of the social-networking system, one of the nodes corresponding to the first user and one or more other nodes corresponding respectively to each of the one or more authorized users; and
   a first distance from the first wireless device, wherein an authorized user of the one or more authorized users must be located within the first distance of the first wireless device in order to receive the data of the first data type;
   by the first wireless device, receiving from the social-networking system an indication that one of the authorized users has performed a check-in to a location that is within the first distance of the first wireless device; and
   by the first wireless device, sending, based on the received indication that the one of the authorized users has performed the check-in, the data of the first data type, wherein:
   the data of the first data type is only available to one or more second wireless devices, wherein each of the second wireless devices is associated with an authorized user and is located within the first distance of the first wireless device; and
   the data of the first data type is sent as part of a data encoding matrix, wherein the data encoding matrix comprises a first column vector corresponding to the data of the first data type and L redundant copies of another column vector corresponding to data of a second data type, wherein L is a positive integer.

2. The method of claim 1, further comprising:
   by the first wireless device, providing a user interface that allows the first user to specify the first data type, the one or more attributes of the one or more edges, or the first distance.

3. The method of claim 1, wherein the one or more attributes of the one or more edges between the nodes of the first user and the authorized users comprise friendship, family relationship, business relationship, employment relationship, fan relationship, follower relationship, visitor relationship, subscriber relationship, superior relationship, subordinate relationship, reciprocal relationship, or non-reciprocal relationship.

4. The method of claim 1, wherein the each authorized user is further determined based on a degree of separation between the nodes of the first user and the authorized users.

5. The method of claim 1, further comprising:
   by the first wireless device, prior to sending the data of the first data type, receiving security information from one of the second wireless devices associated with the authorized users, the security information comprising a device orientation, an inertial signature, a password, a personal identification number, or data sent by near field communication (NFC).

6. The method of claim 1, further comprising:
   by the first wireless device, encrypting the data of the first data type wherein the data of the first data type can only be decrypted by the second wireless devices associated with the authorized users.

7. The method of claim 1, further comprising determining a location of the first wireless device based at least in part on signal triangulation or GPS coordinates associated with the first wireless device.

8. The method of claim 1, wherein the first distance from the first wireless device is associated with a first power level, the first power level being greater than or equal to a minimum power level required to send the data of the first data type over the first distance from the first wireless device.

9. The method of claim 1, wherein:
   the first distance is less than or equal to one meter; and
   the first data type comprises private social-networking information, contact information, or a private document.

10. The method of claim 1, further comprising:
    by the first wireless device, identifying an additional user of the social-networking system authorized to receive data of the second data type from the first wireless device;

by the first wireless device, determining a second distance from the first wireless device, wherein the additional user must be located within the second distance of the first wireless device in order to receive the data of the second data type;

by the first wireless device, receiving an indication that the additional user is located within the second distance of the first wireless device; and by the first wireless device, sending the data of the second data type, wherein the data of the second data type is sent in the data encoding matrix as the L redundant copies of the another column vector.

11. The method of claim 10, wherein:
the data of the first data type is decodable by each of the one or more second wireless devices and is not decodable by a third wireless device associated with the additional user; and
the data of the second data type is not decodable by any of the second wireless devices and is decodable by the third wireless device.

12. The method of claim 10, wherein:
the second distance is greater than the first distance;
the data of the first data type is sent using a first bandwidth based on the first distance; and
the data of the second data type is sent using a second bandwidth based on the second distance, the second bandwidth being lower than the first bandwidth.

13. The method of claim 10, wherein:
the second distance is greater than the first distance;
the data of the first data type is sent using a first power level based on the first distance; and
the data of the second data type is sent using a second power level based on the second distance, the second power level being greater than the first power level.

14. A system comprising: one or more processors; and a memory coupled to the processors comprising instructions executable by the processors, the processors being operable when executing the instructions to:
determine:
a first data type;
one or more users authorized to receive data of the first data type, the authorized users being members of a social-networking system, wherein each authorized user is determined based on one or more attributes of one or more edges between nodes in a social graph of the social-networking system, one of the nodes corresponding to a first user and one or more other nodes corresponding respectively to each of the one or more authorized users; and
a first distance from a first wireless device associated with the first user, wherein an authorized user of the one or more authorized users must be located within the first distance of the first wireless device in order to receive the data of the first data type;
receive from the social-networking system an indication that one of the authorized users has performed a check-in to a location that is within the first distance of the first wireless device; and
send, based on the received indication that the one of the authorized users has performed the check-in, the data of the first data type, wherein:
the data of the first data type is only available to one or more second wireless devices, wherein each of the second wireless devices is associated with an authorized user and is located within the first distance of the first wireless device; and
the data of the first data type is sent as part of a data encoding matrix, wherein the data encoding matrix comprises a first column vector corresponding to the data of the first data type and L redundant copies of another column vector corresponding to data of a second data type, wherein L is a positive integer.

15. The system of claim 14, wherein the processors are further operable when executing the instructions to:
provide a user interface that allows the first user to specify the first data type, the one or more attributes of the one or more edges, or the first distance.

16. The system of claim 14, wherein the one or more attributes of the one or more edges between the nodes of the first user and the authorized users comprise friendship, family relationship, business relationship, employment relationship, fan relationship, follower relationship, visitor relationship, sub scriber relationship, superior relationship, subordinate relationship, reciprocal relationship, or non-reciprocal relationship.

17. The system of claim 14, wherein the each authorized user is further determined based on a degree of separation between the nodes of the first user and the authorized users.

18. The system of claim 14, wherein the processors are further operable when executing the instructions to:
prior to sending the data of the first data type, receive security information from one of the second wireless devices associated with the authorized users, the security information comprising a device orientation, an inertial signature, a password, a personal identification number, or data sent by near field communication (NFC).

19. One or more computer-readable non-transitory storage media embodying software that is operable when executed to:
determine:
a first data type;
one or more users authorized to receive data of the first data type, the authorized users being members of a social-networking system, wherein each authorized user is determined based on one or more attributes of one or more edges between nodes in a social graph of the social-networking system, one of the nodes corresponding to a first user and one or more other nodes corresponding respectively to each of the one or more authorized users; and
a first distance from a first wireless device associated with the first user, wherein an authorized user of the one or more authorized users must be located within the first distance of the first wireless device in order to receive the data of the first data type;
receive from the social-networking system an indication that one of the authorized users has performed a check-in to a location that is within the first distance of the first wireless device; and
send, based on the received indication that the one of the authorized users has performed the check-in, the data of the first data type, wherein:
the data of the first data type is only available to one or more second wireless devices, wherein each of the second wireless devices is associated with an authorized user and is located within the first distance of the first wireless device; and
the data of the first data type is sent as part of a data encoding matrix, wherein the data encoding matrix comprises a first column vector corresponding to the data of the first data type and L redundant copies of another column vector corresponding to data of a second data type, wherein L is a positive integer.

20. The media of claim 19, wherein the software is further operable when executed to:
   provide a user interface that allows the first user to specify the first data type, the one or more attributes of the one or more edges, or the first distance.

\* \* \* \* \*